United States Patent
Madlener et al.

(10) Patent No.: US 7,460,970 B2
(45) Date of Patent: Dec. 2, 2008

(54) METHOD AND DEVICE FOR MEASURING WORKPIECES WITH A MEASURING PROBE ON A MACHINE TOOL

(76) Inventors: Wolfgang Madlener, Königsbergerstrasse 12, Ravensburg (DE) D-88212; Wilfried Veil, Schornreuteweg 15, Ravensburg (DE) D-88212

( * ) Notice: Subject to any disclaimer, the term of this patent is extended or adjusted under 35 U.S.C. 154(b) by 0 days.

(21) Appl. No.: 11/402,766

(22) Filed: Apr. 12, 2006

(65) Prior Publication Data

US 2006/0235636 A1    Oct. 19, 2006

(30) Foreign Application Priority Data

Apr. 15, 2005   (DE) .................. 10 2005 017 708

(51) Int. Cl.
*G01C 17/38*   (2006.01)
(52) U.S. Cl. ............................................. 702/94
(58) Field of Classification Search .............. 702/94
See application file for complete search history.

(56) References Cited

U.S. PATENT DOCUMENTS

| | | | |
|---|---|---|---|
| 4,888,877 A | 12/1989 | Enderle et al. | |
| 5,111,590 A * | 5/1992 | Park | 33/502 |
| 5,138,563 A | 8/1992 | Debitsch et al. | |
| 5,257,460 A * | 11/1993 | McMurtry | 33/502 |
| 5,665,896 A | 9/1997 | McMurtry | |
| 5,848,477 A | 12/1998 | Wiedmann et al. | |

FOREIGN PATENT DOCUMENTS

| | | |
|---|---|---|
| DE | 36 21 626 A1 | 1/1988 |
| DE | 40 01 433 A1 | 7/1991 |
| DE | 196 05 776 A1 | 8/1997 |
| DE | 696 25 001 T2 | 5/2003 |
| EP | 0 317 967 A2 | 5/1989 |

* cited by examiner

*Primary Examiner*—Bryan Bui
*Assistant Examiner*—Aditya S. Bhat
(74) *Attorney, Agent, or Firm*—Burr & Brown

(57) ABSTRACT

A method for measuring workpieces with a measuring probe on a machine tool with linear axes of motion and at least one pivoting axis is provided, whereby the deviation of an actual position of a calibrating body in a pivoted position, in relation to a theoretical pivoted position which the calibrating body ideally occupy without a pivoting error, is used to determine a correction value. An actual measured value for calculating a coordinate of a measuring point on a measurement object or a theoretical measuring-point coordinate to be approached on the measurement object is corrected using the correction value when a measurement is carried out on the measurement object in a corresponding pivoted position. A device for implementing the method is also provided.

6 Claims, 1 Drawing Sheet

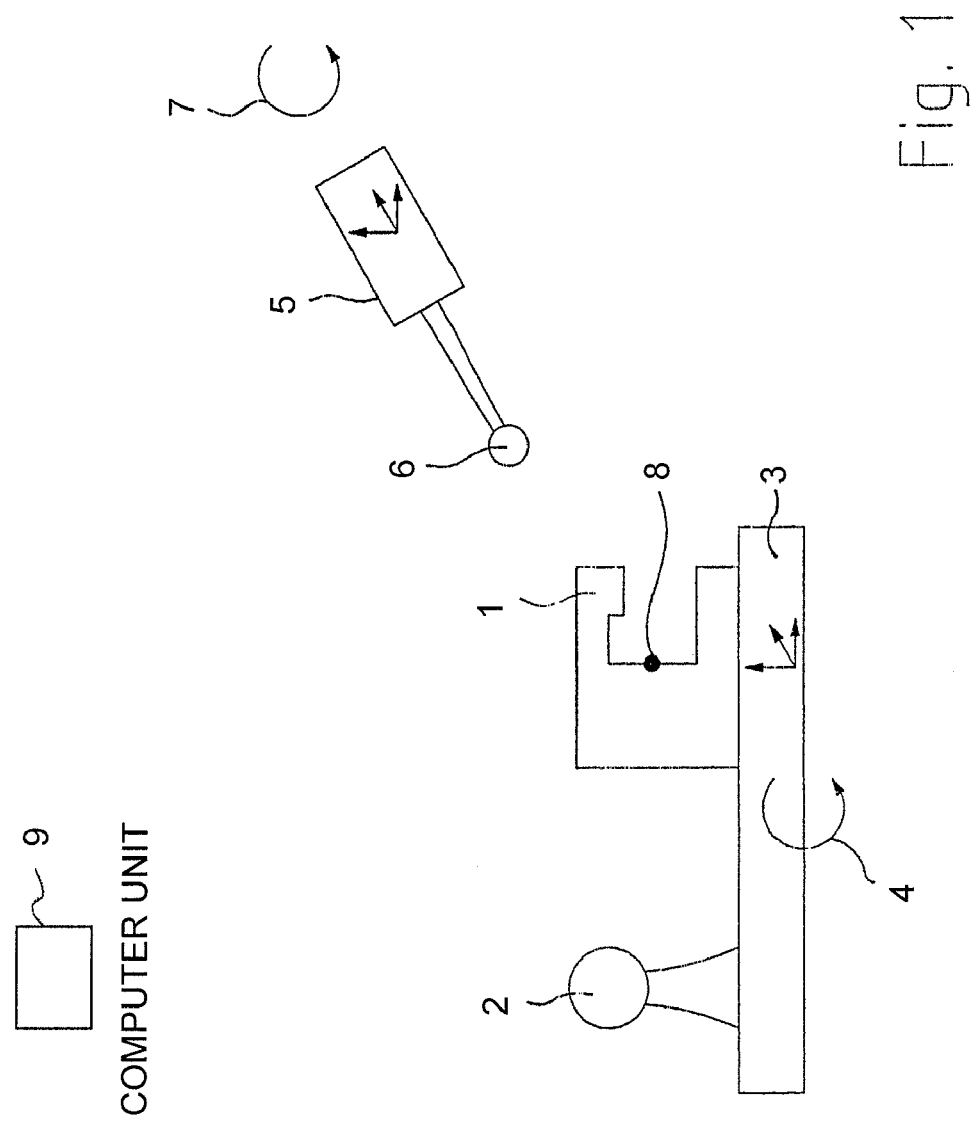

METHOD AND DEVICE FOR MEASURING WORKPIECES WITH A MEASURING PROBE ON A MACHINE TOOL

FIELD OF THE INVENTION

The present invention relates to a method and a device for measuring workpieces with a measuring probe on a machine tool with linear axes of motion and at least one pivoting axis.

BACKGROUND OF THE INVENTION

Use is made increasingly frequently of machine tools which have two further pivoting axes in addition to three linear axes, which are referred to as five-axis machines. The pivoting axes may relate to a pivoting possibility of the workpiece and/or of the tool. However, the pivoting axes are less accurate in comparison with the linear axes. As a result, the actual position of a workpiece, of a tool or of a measuring probe may not correspond to the theoretically calculated position, for example, after pivoting-in on the corresponding pivoting axes. The causes are, on the one hand, angle errors of the pivoting axes and, on the other hand, inaccuracy in the position of the pivoting axis center. These inaccuracies are exacerbated if the machine is subject to considerable temperature variations.

SUMMARY OF THE INVENTION

The object of the present invention is to achieve greater accuracy in the measurement of workpieces in machine tools with at least one pivoting axis. This object and advantageous developments are achieved by means of the features of the present invention described below.

The present invention provides a method for measuring workpieces with a measuring probe on a machine tool which includes linear axes of motion and at least one pivoting axis.

The core of the present invention relates to the fact that the deviation of an actually determined position of a calibrating body (e.g., a calibrating sphere) in a pivoted position, for example of the calibrating body and/or of the measuring probe, in relation to a theoretical position which should ideally result for the calibrating body without a pivoting error, is used in order to determine a correction value. Using the correction value, an actual measured value for calculating a coordinate of a measuring point on a measurement object or a theoretical measuring-point coordinate to be approached on the measurement object is corrected when a measurement is carried out on the measurement object in a corresponding pivoted position.

In principle, the pivoting error of both the measurement object and the measuring probe can be corrected in this way.

The correction endeavor is based on the knowledge that, during the measurement of workpieces on a machine tool, for example during the movement of a measuring probe from a predefined starting position in the direction of an end position by pivoting the measuring probe, the end position is not actually reached due to a pivoting error. By means of the procedure according to the present invention, the pivoting error is detected and then reduced, and ideally compensated.

In the simplest variant, the deviation determined on the calibrating body is directly subtracted from or added to a measured value on the measurement object, for example a workpiece, according to which sign the deviation has. If a measuring point on the measurement object is to be approached, the theoretical coordinate is corrected by the deviation determined on the calibrating body.

According to a preferred embodiment of the present invention, the position of the calibrating body in an unpivoted starting position is determined. On the basis of this position, the theoretical position of the calibrating body which it should ideally occupy is then determined. In this manner, it is advantageous if a sphere is used as the calibrating body, with the reference coordinate being the sphere center.

The measuring accuracy is further improved if a correction value is determined and the desired measurement is carried out only after the pivoting axes have been clamped. This accounts for the problem of the pivoting movements of the at least one pivoting axis being inaccurate and non-repeatable.

In practice, such a procedure can be applied to different cases:

a) When the workpiece is pivotable on two axes, and a measuring probe receiver having X-Y-Z mobility is used, the pivoting axes on the workpiece are clamped before a measurement is performed. A correction value is then determined on a calibrating body which has moved together with the workpiece, after which the actual measurement on the workpiece is carried out;

b) When pivoting movements are performed only by the measuring probe, before measurement, the pivoting axes are clamped. The measuring probe carries out the measurements by means of X-Y-Z mobility. The measurements are corrected by a correction value which has been determined on the calibrating body after clamping the pivoting axes; and c) In the case where both the workpiece and the measuring probe can be pivoted about a pivoting axis, the pivoting axes are clamped before measurement. With the pivoting axis clamped, a correction value is determined on a calibrating body which is moved together with the workpiece.

The determined correction value is then applied in each case during the measuring operation.

In cases a) and c), the calibrating body must be moved in the same way as the measurement object in order to obtain the desired error reduction or compensation.

In case b), where the workpiece only moves in the X, Y or Z direction, the measuring body can also be stationary.

According to a particularly preferred embodiment of the present invention, the measurement object is moved, in particular pivoted, in the same way as the calibrating body. In order to obtain a correction value, measurement can then be performed on the calibrating body before or after the actual measurement at the measuring location, and the correction value is applied during measurement.

In a device for measuring workpieces with a measuring probe on a machine tool with linear axes of motion and at least one pivoting axis for tool and/or workpiece, for example, that a computer unit is designed for the purpose of:

a) using the deviation of an actually determined position of a calibrating body in a pivoted position, in relation to a theoretical position which should ideally result for the calibrating body without a pivoting error, in order to calculate a correction value; and b) using the correction value correcting an actual measured value b1) to calculate a coordinate of a measuring point on a measurement object b2) or to calculate a theoretical measuring-point coordinate to be approached on the measurement object when a measurement is carried out on the measurement object in a corresponding pivoted position, for example of the workpiece or of the measuring probe.

Furthermore, it is especially preferred for the computer unit, shown schematically as reference numeral 9 in FIG. 1 to use the position of the calibrating body in an unpivoted starting position as the reference position in order to relate all pivoted positions to it.

The calibrating body is preferably rigidly connected to a measurement object, for example a workpiece, which is mounted pivotably about at least one pivoting axis. The calibrating body thus performs all of the movements that the workpiece does. After a pivoting operation, it is possible, with the at least one pivoting axis fixed, to determine the pivoting error on the calibrating sphere that is also pivoted in order to correct a corresponding actual measured value on the workpiece. This makes it possible to take into account, in particular, inaccuracies in the pivoting movement which occur in different ways when a pivoting movement, which is always the same, is carried out to reach a predefined point, which are taken into account only inadequately by a single detection of a pivoting error during pivoting into the predetermined position. Great repeat accuracies can consequently be achieved.

An illustrative embodiment of the present invention is shown in FIG. 1, which illustrates a measuring construction for measuring a workpiece in a diagrammatic view.

FIG. 1 shows a workpiece 1 and a calibrating body 2, which are arranged on a receiver 3 which can be moved in the X, Y and Z directions and pivoted about a pivoting axis symbolized by arrow 4.

A measuring probe 5 with a measuring sphere 6 is also illustrated. The measuring probe 5 can likewise be moved in the coordinate directions X, Y and Z and pivoted about a pivoting axis symbolized by arrow 7.

A measurement on the workpiece 1 can take place as follows:

In order to reach a desired measuring location 8 on the workpiece 1, both the measuring probe 5 and the receiver 3, for example, are brought into a pivoted position so that the measuring sphere 6 on the measuring probe 5 can reach the measuring location 8. The pivoting axes are then clamped.

With the aid of the calibrating body 2, the error caused by the pivoting operations is determined. For this, the actual position of the calibrating sphere 2 is compared with a theoretical position which the calibrating sphere should occupy without pivoting errors of the pivoting axes.

In this operation, both the pivoting error of the receiver 3 and the pivoting error of the measuring probe 5 are taken into account.

When measurement takes place at the measuring location 8, the combined determined pivoting error is then applied to the determined measured value of an actual coordinate or a theoretical coordinate which is corrected by the pivoting error if it is a case of approaching a desired measuring location 8 with the measuring probe 5.

With this procedure, not only can pivoting errors be compensated to a very great extent, but also repeat inaccuracies can be excluded by determining the pivoting error only when the pivoting axes 4 and 7 have been clamped.

The invention claimed is:

1. A device for measuring workpieces with a measuring probe on a machine tool having linear axes of motion and at least one pivoting axis, the device comprising:
    a computer unit including a program, stored on computer-readable media, the program being adapted to determine a position of a calibrating body in an unpivoted starting position, determine a theoretical position that the calibrating body should occupy without pivoting error after a pivoting movement based on the unpivoted starting position, calculate a pivoting error correction value using a deviation value between a measured position of the calibrating body in the pivoted position and the theoretical position that the calibrating body should occupy in the pivoted position without a pivoting error, and to use the correction value, which compensates for the pivoting error in the pivoted position, to calculate one of a measuring point coordinate on a measurement object or a theoretical measuring-point coordinate to be approached on the measurement object when the measurement object is measured in a corresponding pivoted position.

2. The device of claim 1, wherein the calibrating body is rigidly connected to the measurement object.

3. The device according to claim 1, wherein the calibrating body has a spherical shape.

4. A method for measuring workpieces with a measuring probe on a machine tool having linear axes of motion and at least one pivoting axis, the method comprising the steps of:
    providing a computer including a program stored on computer-readable media;
    pivoting at least one of the machine tool and the measuring probe to a pivoted position;
    inputting measurement data to the computer; and
    executing the program, including the steps of
        determining a position of a calibrating body in an unpivoted starting position,
        determining a theoretical position that the calibrating body should occupy without a pivoting error after a pivoting movement,
        determining a deviation value between a measured position of the calibrating body in the pivoted position and the theoretical position that the calibrating body should occupy in the pivoted position without pivoting error,
        using the deviation value to calculate a correction value that compensates for the pivoting error in the pivoted position, and
        using the correction value to determine one of a measuring point coordinate on an object to be measured and a theoretical measuring point coordinate to be approached on the measurement object when the measurement object is measured in a corresponding pivoted position.

5. The method of claim 4, wherein the correction value is determined and the measurement is carried out after the pivoting axes are clamped.

6. The method of claim 4, wherein the calibrating body is moved together with the measurement object in the same way.

* * * * *